Sept. 29, 1959     L. C. BURGMAN     2,906,562
TRACK PIN AND BUSHING SEAL
Filed July 19, 1955
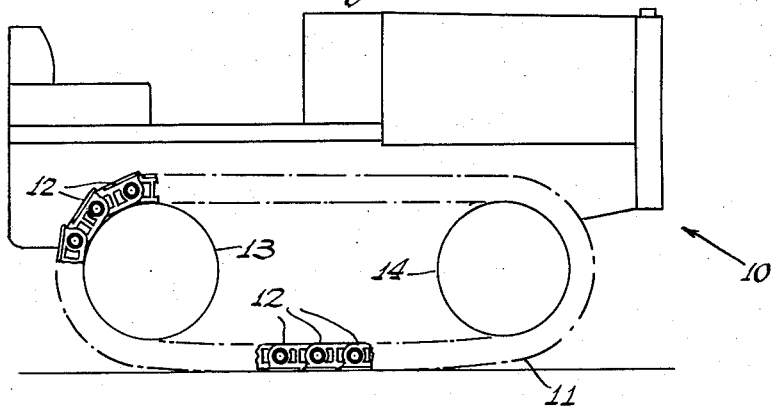
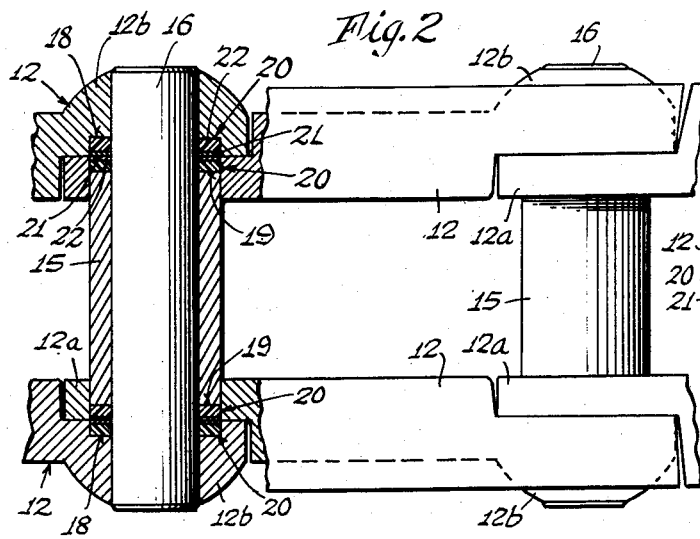
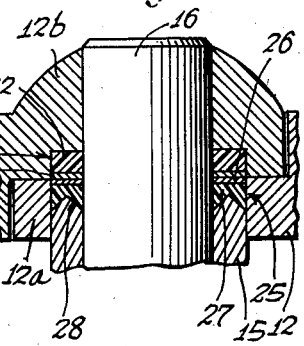
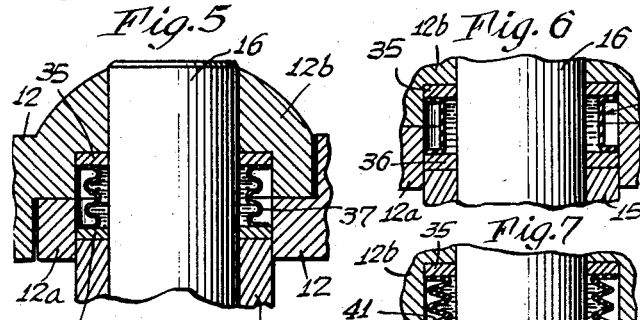
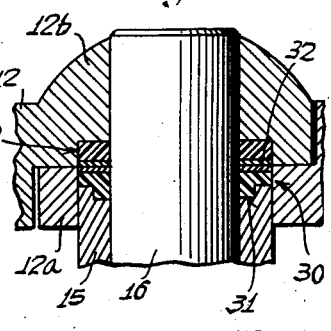
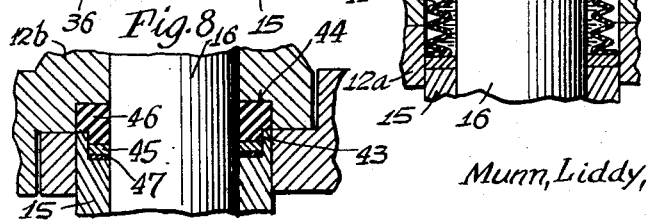
INVENTOR.
Leo C. Burgman
BY
Munn, Liddy, Nathanson & March
ATTORNEYS

United States Patent Office 2,906,562
Patented Sept. 29, 1959

2,906,562

TRACK PIN AND BUSHING SEAL

Leo C. Burgman, Jacksonville, Fla.

Application July 19, 1955, Serial No. 522,912

6 Claims. (Cl. 305—10)

This invention relates to mechanical sealing means for use between relatively movable members, and more particularly to seals adapted to be disposed in spaces between members which have limited relative movement, as for example, between adjacent track links in an endless track of a tractor or the like.

In the use of tractors the track links generally operate in mud, dirt and fresh earth of varying moisture content. Under such conditions foreign material enters between the relatively movable members of the track, for instance between the track bushing and the shaft or pin which is journaled therein. This situation causes marked abrasion and wear between these parts, resulting in premature breakdown, frequent replacements and adjustment. The problem is further aggravated since the space available for the installation of sealing means is extremely limited, thereby rendering difficult the use of the usual sealing washers, rings or the like which are at present available on the market.

The present invention obviates the above condition of entrance of foreign matter and excessive wear in an endless track or similar structure, and an object of the invention is to provide a novel and improved sealing means which may be readily incorporated in track members despite the limited space available.

Another object of the invention is to provide an improved sealing means of the above type, which is extremely effective in keeping out dirt, dust and other undesirable matter.

A still further object of the invention is to provide an improved sealing means as above characterized, which has a long and useful life and does not require frequent replacement.

A feature of the invention resides in the provision of an improved sealing means of the above type, which is relatively simple in construction and economical to manufacture.

Another feature of the invention resides in the provision of a sealing means in accordance with the above, which makes it possible to provide continual lubrication between the relatively movable parts, thereby further minimizing the wear thereof.

Other features and advantages will hereinafter appear.

In the accompanying drawings:

Fig. 1 is a schematic side-elevational view of a track-type tractor having the usual endless track or tread;

Fig. 2 is a detail, partly in plan and partly in section, of a portion of the endless track of the tractor, incorporating the improved sealing means of the invention;

Fig. 3 is a fragmentary sectional view of a portion of the track, showing a modified form of sealing means;

Fig. 4 is a view like Fig. 3, showing still another modified form of sealing means;

Figs. 5, 6 and 7 are views like Figs. 3 and 4 but showing still further modified forms of sealing means which are arranged to contain lubricant;

Fig. 8 is a fragmentary axial sectional view of a portion of a track, showing another modified form of sealing means made in accordance with the invention.

The present improved sealing means which is illustrated and described herein is shown in conjunction with the link members of an endless track for a tractor or the like, where limited space is available between the track links and connecting pins and bushings. This showing and description, however, is for purposes of illustration, and it should be understood that a seal made in accordance with this invention may be employed for other applications, particularly wherever relatively movable parts have a limited degree of movement. Such other applications may include other types of endless chains, and relatively turnable members having short movement such as levers, bell cranks and similar machine parts. The scope of the invention accordingly is defined in the appended claims and is not limited to the particular application set forth herein.

Referring to Fig. 1 there is shown a tractor 10 having an endless track 11 formed of pivotally connected links 12, the track 11 passing around a rear drive sprocket 13 and a front idler sprocket 14 of the tractor. It will be understood that during operation of the tractor 10 limited relative turning movements of the links 12 occur as they approach and leave the sprockets 13 and 14.

The track 11 is usually formed of spaced chains of links, as seen in Fig. 2, and track rollers (not shown) are usually provided on the tractor to engage rails formed on one edge of the links 12, the opposite edges of the links having the usual shoe surfaces or the like.

As shown in Fig. 2 pivotal connections are effected between the links 12 by means of bushings 15 and pins or shafts 16 passing through said bushings. Usually each bushing 15 is press-fitted in one link 12 and each pin 16 is press-fitted in an adjoining link 12 which engages and overlaps the first-mentioned link. The pins 16 are turnable in the bushings 15, and the degree of turning is quite limited, being determined at the approach or departure of the links to and from the sprockets 13 and 14, considering the diameters of the sprockets.

In the use of the track 11 heretofore, dirt and other foreign matter has been able to work its way between the pins 16 and the bushings 15, causing excessive abrasion and wear and robbing these parts of proper lubrication. By the present invention I provide a novel and improved sealing means by which there is effectively prevented the entrance of such dirt and matter inside of the bushings 15, such sealing means requiring but little space and having an effective, long life.

As shown in Fig. 2 I provide annular recesses 18 in the outer overlapping ends of the links 12, and similar annular recesses 19 in the inner, overlapped ends of the links. The recesses 18 and 19 are preferably of the same diameter and have the diameter of the bushings 15. In the recesses 18 and 19 I provide sealing rings 20, each ring comprising a metal facing 21 and a resilient yieldable body or backing 22 for the facing 21. The metal faces 21 engage each other and are relatively movable. Preferably they are secured to the bodies 22 so as to constitute therewith a unitary sealing ring.

The faces 21 may be of brass, bronze, or hardened steel, for example, and they may be paired to provide the most advantageous wearing action. For instance, a steel and a brass facing may constitute each pair, or a steel and bronze facing. The bodies 22 may be formed of rubber or rubber like material, and may be adhered to the faces 21 as by vulcanizing, cementing or in other ways.

Preferably the bodies 22 are somewhat larger in cross section than shown in Fig. 2, being compressed during installation and assembly of the links 12. Thus, the faces 21 will be maintained in intimate contact with each other at all times, and will have slight relative turning movement during use of the track. The bodies 22 will be securely frictionally held in the recesses 18, and will press against the peripheries of the pins 16.

By this organization I provide an effective and efficient seal by which foreign matter is prevented from entering the bushings 15. The faces 21 have perfectly flat, close-fitting surfaces which will not permit the passage of dirt or dust particles or water, and constitute a wear-resistant protection which prevents wear and deterioration of the bodies 22. The sealing rings 20 are simple and economical to manufacture, and may be readily quickly installed in the ends of the links 12 and also easily replaced when this should be necessary. With the use of such sealing means the life of the track 11 is greatly extended, and there is minimized the replacement of track sections, adjustment to compensate for wear, and down time of the tractor 10.

In Fig. 3 there is shown a modified form of sealing ring 25 for incorporation in the inner ends 12a of the links 12. The sealing ring 25 has a metal facing 26 secured to a resilient body 27 which is provided with an annular groove 28 in the end opposite the facing 26. The recess in the link end 12a is correspondingly formed, as clearly shown in Fig. 3, and by this organization I provide a more effective seal between the ring 25 and the link end 12a.

Another modified form of sealing means is shown in Fig. 4. In this figure a sealing ring 30 is provided, having a stepped or shouldered end surface 31 opposite its metal facing 32. The recess in the link end 12a is formed with a stepped bottom to snugly receive the sealing ring 30, thereby to provide an effective seal between the link 12 and the ring 30.

Another modified form of sealing means made in accordance with the invention is shown in Fig. 5. This sealing means comprises a pair of washers 35 and 36 which may be of rubber, plastic or plastic-like material or of metal, and which have a close fit in the recesses of the link ends.

The washers 35 and 36 are connected to each other by a collar 37 having the form of a bellows, the ends to the collar being outturned to constitute flanges and being adhered to the washers 35 and 36 in any suitable manner.

The collar 37 may be made of rubber or rubber-like material, and may be adhered to the washers 35, 36 by a vulcanizing process, in which case the said washers may be advantageously formed of brass or of steel, or the collar 37 may be cemented to the washers or made integral therewith to constitute a single unit. The space within the collar 37 may be filled with a lubricant as shown, thereby to provide for lubrication of the pin 16 in the bushing 15. By virtue of the relatively limited turning movement between the link ends 12a and 12b only a slight deformation of the collar 37 will occur, such deformation being insufficient to damage or rupture the collar or separate it from the washers 35 and 36.

As shown in Fig. 6 a sealing collar 40 of cylindrical shape may be provided instead of the bellows-shaped collar 37.

In Fig. 7 a sealing collar 41 is shown, having more folds than the collar 37 shown in Fig. 5. In both Figs. 6 and 7 the collars 40 and 41 may contain lubrication as shown. In each instance the collars will function in the manner described in connection with Fig. 5.

In Fig. 8 another type of sealing means is shown, illustrating a further modification of the invention. In this figure the bushing 15 is provided with a recess 43, and the link end 12b has a recess 44, said recesses extending around the pin 16 and facing each other. In the recesses 43 and 44 a composite annular sealing means is provided, comprising a washer or ring 45 fitted in the recess 43 and an elastic washer or ring 46 fitted in both the recesses 43 and 44. The ring 45 may be advantageously made of steel or other metal, and the ring 46 may be made of rubber, plastic, or like elastic material. Preferably the rings 45 and 46 are bonded to each other. A smooth, hardened bearing washer 47 may also be provided in the recess 43, as a facing for the recess.

By the present invention I have provided a novel and improved sealing means suitable for use in restricted spaces where limited relative movement exists between adjacent members, said sealing means being simple and economical to manufacture, being effective in use and resistant to wear and abrasion whereby it has a long useful life. When necessary, the sealing means may be easily and quickly replaced, during servicing of the track or the equipment on which it is installed.

Variations and modifications may be made within the scope of the claims and portions of the improvements may be used without others.

I claim:

1. In combination, a pair of juxtaposed structures having limited relative turning movement and having oppositely-disposed recesses opening into each other and extending around the axis of rotation one of said structures comprising a pair of members fitted to each other and forming one of the said recesses; sealing means disposed in said recesses, including rings fitted to the recesses and immovable therein, and including at least one member disposed between the rings and having an abutting relationship with the latter.

2. The invention as defined in claim 1 in which the member disposed between the rings comprises a deformable collar.

3. In combination, a pair of juxtaposed structures having limited relative turning movement and having oppositely-disposed recesses opening into each other and extending around the axis of rotation, one of said structures comprising a pair of members fitted to each other and forming one of the said recesses; a pair of sealing rings disposed in said recesses, said rings having resilient and yieldable body portions fitted into the recesses and immovable therein, and having rigid, wear-resistant faces engaging each other and secured to the said body portions.

4. In combination, a pair of juxtaposed structures having limited relative turning movement and having oppositely-disposed recesses opening into each other and extending around the axis of rotation, one of said structures comprising a pair of members fitted to each other and forming one of the said recesses; a pair of sealing rings disposed in said recesses, said rings having resilient and yieldable body portions fitted into the recesses and immovable therein, and having rigid, wear-resistant metal faces engaging each other and secured to the said body portions.

5. The invention as defined in claim 4 in which one face is steel and the other is a copper alloy.

6. In combination, a pair of juxtaposed structures having limited relative turning movement, at least one of said structures having a recess extending around the axis of rotation and facing the other structure; sealing means disposed between the structures and including a multi-part ring occupying the said recess, one of the parts of said ring being resilient and disposed completely in the recess and closely fitting the same and the other part being non-yielding and wear-resistant, said sealing means including a second ring having a resilient annular member and an annular non-yielding wear-resistant member which abuts the said other part of the multi-part ring first-mentioned above.

References Cited in the file of this patent

UNITED STATES PATENTS

| | | |
|---|---|---|
| 1,237,814 | Porter et al. | Aug. 21, 1917 |
| 2,481,727 | Deffenbaugh | Sept. 13, 1949 |
| 2,551,695 | Oddy | May 8, 1951 |
| 2,699,974 | Deffenbaugh | Jan. 18, 1955 |